US011617958B2

(12) United States Patent
Prizzia

(10) Patent No.: US 11,617,958 B2
(45) Date of Patent: Apr. 4, 2023

(54) EDUCATIONAL GAMING SOFTWARE

(71) Applicant: Habitheque, Pipersville, PA (US)

(72) Inventor: Victoria Prizzia, Pipersville, PA (US)

(73) Assignee: Habitheque, Pipersville, PA (US)

( * ) Notice: Subject to any disclaimer, the term of this patent is extended or adjusted under 35 U.S.C. 154(b) by 0 days.

(21) Appl. No.: 17/376,373

(22) Filed: Jul. 15, 2021

(65) Prior Publication Data

US 2022/0016531 A1 Jan. 20, 2022

Related U.S. Application Data

(60) Provisional application No. 63/053,062, filed on Jul. 17, 2020.

(51) Int. Cl.
*A63F 13/67* (2014.01)
*A63F 13/798* (2014.01)
*A63F 13/822* (2014.01)

(52) U.S. Cl.
CPC ............ *A63F 13/67* (2014.09); *A63F 13/798* (2014.09); *A63F 13/822* (2014.09); *A63F 2300/558* (2013.01); *A63F 2300/6027* (2013.01); *A63F 2300/807* (2013.01)

(58) Field of Classification Search
None
See application file for complete search history.

(56) References Cited

U.S. PATENT DOCUMENTS

| 7,402,105 | B1* | 7/2008 | Hutter | G09B 7/02 434/350 |
| 8,016,678 | B1* | 9/2011 | Hutter | A63F 13/792 434/350 |
| 8,016,680 | B1* | 9/2011 | Hutter | A63F 13/79 434/350 |
| 9,205,329 | B2 | 12/2015 | McBride et al. | |
| 2002/0043761 | A1 | 4/2002 | Brecheen | |
| 2005/0200078 | A1 | 9/2005 | Montaldo | |
| 2007/0281285 | A1 | 12/2007 | Jayaweera | |
| 2013/0217453 | A1 | 8/2013 | Briggs et al. | |
| 2014/0024464 | A1 | 1/2014 | Belakovsky | |
| 2017/0209779 | A1 | 7/2017 | Etelközi | |
| 2020/0051480 | A1* | 2/2020 | Chang | G09G 3/20 |

* cited by examiner

*Primary Examiner* — Ronald Laneau
(74) *Attorney, Agent, or Firm* — Gearhart Law, LLC; David Postolski

(57) ABSTRACT

An online multiplayer simulation game is described. The online multiplayer simulation game presents a computer-generated gameplay virtual world, where acquiring and demonstrating mastery of educational skills is a requirement for advancement of a character, associated with a user or a learner, in the game. The game provides a method for effectively teaching a set of educational skills by motivating the learner to improve understanding of the educational skills by having to demonstrate the educational skills as part of the game. Upon successful demonstration of the educational skills, components within the gaming realm are modified or enhanced.

18 Claims, 9 Drawing Sheets

EDUCATIONAL GAMING SOFTWARE

CROSS-REFERENCE TO RELATED APPLICATIONS SECTION

This application is a U.S. Non-Provisional patent application that claims priority to U.S. Provisional Patent Application Ser. No. 63/053,062 filed on Jul. 17, 2020, the entire contents of which are hereby incorporated by reference in their entirety.

FIELD OF THE EMBODIMENTS

The field of the invention and its embodiments relate to systems for motivating students to achieve educational goals. More specifically, the field of the invention and its embodiments relate to systems for motivating students to achieve educational goals through use of an online multi-player simulation game that presents a computer-generated gameplay virtual world, where acquiring and demonstrating mastery of educational skills is a requirement for advancement of a character, associated with the learner, in the game.

BACKGROUND OF THE EMBODIMENTS

Computerized gaming has become a popular form of entertainment. Many computerized games provide a virtual world with the player assuming the role of a character interacting with other characters, objects, or locations in an attempt to accomplish a series of tasks leading to an overall goal. Computerized gaming may be played on a variety of hardware platforms, from specialized individual computer gaming devices to games played with a general-purpose PC on a website on the Internet. Games that create elaborate virtual worlds and allow multiple players to inhabit these worlds are known as massively multiplayer online role playing games. Some of these games may also be played using the Internet.

A problem exists to motivate students to acquire educational skills outside of the required classroom hours of one's education program. Though individuals frequently engage in computerized gaming, most of these games fail to provide an educational aspect to foster student learning. More specifically, computerized gaming fails to provide education regarding environmental awareness and sustainable resource protection. Additionally, computerized gaming fails to provide education regarding natural water systems.

There is a need for a computerized game that users find desirable to play, which integrates means to acquire educational skills or knowledge (such as knowledge regarding environmental awareness and sustainable resource protection). There is also a need for a computerized game that provides valuable entertainment to the masses.

REVIEW OF RELATED TECHNOLOGY

U.S. Pat. No. 7,402,105 B1 and U.S. Pat. No. 8,016,680 B1 relate to a massively multiplayer educational online game. The game presents a computer-generated gameplay world where acquiring and demonstrating mastery of educational skills is a requirement for survival and advancement of a learner's game character. The game also provides a method for effectively teaching a set of target educational skills by motivating the learner to improve understanding of the skills by having to demonstrate the skills as part of the game.

U.S. Published Patent Application No. 2002/0043761 A1 relates to a computerized educational game. The educational game includes an interactive journey or mission that provides educational experiences for one or more players related to a subject, such as science, history, social science, geography, agriculture, space exploration, etc.

U.S. Published Patent Application No. 2007/0281285 A1 relates to an interactive educational game that includes adventure storylines in which a player advances, scores points, or wins by correctly answering educational challenges posed throughout the game. The game gauges and dynamically adjusts a player's skill and knowledge level for a particular subject (e.g., math, grammar, spelling, science, etc.) to tailor the challenges and/or speed of the game accordingly. As the game progresses, it monitors the player's progress in terms of skill and/or knowledge level and dynamically adjusts the type and/or difficulty of the questions to challenge the player.

U.S. Pat. No. 9,205,329 B2 relates to a virtual world electronic game that is educational.

U.S. Published Patent Application No. 2014/0024464 A1 describes a massively multiplayer online strategic and multipurpose educational game.

U.S. Published Patent Application No. 2005/0200078 A1 relates to an educational science game that encourages learning, while providing a novel and unique gaming experience. An array of unusual or unique features are combined in the game, such as the ability to move any game piece along a primary and a secondary game board, variable movement for different game pieces depending upon the characteristics of that game piece, the ability to obtain "equipment" to alter those characteristics, and an ultimate goal based upon the acquisition of a plurality of tokens.

U.S. Published Patent Application No. 2017/0209779 A1 describes an apparatus for providing an entertaining environment that balances the "work" and "fun" attributes of an activity so as to promote knowledge accumulation and learning in numerous fields, such as: history, art, and science (e.g., natural sciences, social sciences, human philosophy, psychology, engineering, medicine, physics, electronics, etc.), among others.

U.S. Published Patent Application No. 2013/0217453 A1 describes an educational multi-media interactive play system that has a number of play elements situated in a variety of play environments. The play elements are linked to a common record of participant performance, progress, character attributes, etc. The participant's performance in the play elements determines the play elements to which the participant may proceed, as well as the play parameters of the play element in which the participant is currently involved. The play elements are thus interlinked to define a sequence or path network along which the participant advances. By advancing through the play elements, the participant carries out a plot, story, theme, etc. that attaches a significance to the successful completion of a given play element or elements.

Various educational teaching tools and games exist in the art. However, their means of operation are substantially different from the present disclosure, as the other inventions fail to solve all the problems taught by the present disclosure.

SUMMARY OF THE EMBODIMENTS

The present invention and its embodiments relate to systems for motivating students to achieve educational goals. More specifically, the present invention and its embodiments relate to systems for motivating students to achieve educational goals through use of an online multiplayer simulation game that presents a computer-generated gameplay virtual world, where acquiring and demonstrating mastery of educational skills is a requirement for advancement of a character, associated with the learner, in the game.

A first embodiment of the present invention describes a method of providing an online multiplayer educational game to a learner from a server. In examples, the online multiplayer educational game is a science fiction game. The method includes: detecting a connection of a computing device associated with a learner to a server, providing a virtual world display of a gaming realm associated with the online multiplayer educational game to the computing device of the learner, and allowing the learner to utilize a controller to manage functions of the gaming realm.

The virtual world comprises at least three locations, where a first location of the at least three locations comprises quadrants. Each of the quadrants includes a pod and resources. In examples, the pod in each of the quadrants differs. Further, the pod comprises plant species and/or animal species. The method may also include presenting, via the gaming realm, the pod to the learner when the learner enters the quadrant and encounters the pod or randomly presenting, via the gaming realm, the pod to the learner as the learner advances through the online multiplayer educational game as the character.

The method may further include providing, via the gaming realm, the learner with a character (e.g., an animal) such that the learner controls the character. The learner may also be provided with a vehicle for the learner to advance through the online multiplayer educational game as the character. In examples, the vehicle is a spacecraft.

The method may additionally include providing, via the gaming realm, at least two crew members and another animal to the learner to assist the learner in completing tasks during gameplay. A manifestation of the other animal in the gaming realm is correlated to actions of the learner as the learner advances through the online multiplayer educational game as the character.

The method may also include, via the gaming realm, providing training tasks associated with an educational skill, detecting a successful demonstration of the training tasks associated with the educational skill, and providing mastery tasks associated with the educational skills. The method may further include, via the gaming realm, detecting a successful demonstration of the mastery tasks associated with the educational skill, allowing the learner to advance through the online multiplayer educational game as the character, modifying one or more components in the gaming realm, and updating a learner profile to reflect a successful completion of the mastery tasks associated with the educational skill.

The modification of the one or more components in the gaming realm may include: adding components to the vehicle, enhancing an efficiency of the vehicle, upgrading the vehicle, allowing the learner to add the plant species and/or the animal species from the pod into the vehicle, allowing the learner to add the resources from each of the quadrants into the vehicle, adding a function of the gaming realm to the controller, and allowing the learner to add acquired resources, plant species, and/or animal species into a dwelling associated with a second location of the at least three locations located in the virtual world.

The method may additionally include detecting a failure, via the gaming realm, to demonstrate the mastery tasks associated with the educational skill. In response to this detection, the learner may be provided feedback and the learner profile may be updated to reflect an unsuccessful completion of the mastery tasks associated with the educational skill.

A second embodiment of the present invention describes an apparatus for providing a gaming realm. The gaming realm is configured to teach education skills to a learner. The apparatus includes: a means for engaging the learner to practice the educational skills, a means for the learner demonstrating the educational skills, a means for advancing game performance of the learner with successful demonstration of a subset of the educational skills, and a means for providing feedback to the learner in response to an unsuccessful demonstration of the subset of the educational skills.

A third embodiment of the present invention describes a method of providing an online multiplayer educational and science fiction game to a learner from a server. The method includes: detecting a connection of a computing device associated with a learner to a server, providing a virtual world display of a gaming realm associated with the online multiplayer educational game to the computing device of the learner, where the virtual world comprises at least three locations, and allowing the learner to utilize a controller to manage functions of the gaming realm. A first location of the at least three locations comprises quadrants, where each of the quadrants comprises a pod and resources. The pod in each of the quadrants differs. Furthermore, the pod comprises plant species and/or animal species.

The method also includes, via the gaming realm, providing the learner with a character such that the learner controls the character, providing a vehicle for the learner to advance through the online multiplayer educational game as the character, and providing training tasks associated with an educational skill. In response to detecting, via the gaming realm, a successful demonstration of the training tasks associated with educational skill, the method may additionally include providing mastery tasks associated with the educational skill.

In response to detecting, via the gaming realm, a successful demonstration of the mastery tasks associated with the educational skill, the method may include: allowing the learner to advance through the online multiplayer educational game as the character, modifying one or more components in the gaming realm, and updating a learner profile to reflect a successful completion of the mastery tasks associated with the educational skill. The modification of the one or more components in the gaming realm include: adding components to the vehicle, enhancing an efficiency of the vehicle, upgrading the vehicle, allowing the learner to add the plant species and/or the animal species from the pod into the vehicle, allowing the learner to add the resources from each of the quadrants into the vehicle, adding a function of the gaming realm to the controller, and allowing the learner to add acquired resources, plant species, and/or animal species into a dwelling associated with a second location of the at least three locations located in the virtual world, among others.

In response to detecting a failure, via the gaming realm, to demonstrate the mastery tasks associated with the educational skill, the method further includes providing feedback to the learner via the gaming realm and updating the learner profile to reflect an unsuccessful completion of the mastery tasks associated with the educational skill.

In general, the present invention succeeds in conferring the following benefits and objectives.

It is an objective of the present invention to provide an educational game that motivates the user/player to acquire educational skills.

It is an objective of the present invention to provide an online multiplayer simulation game.

It is an objective of the present invention to provide an online multiplayer simulation game that is science-fiction based.

It is an objective of the present invention to provide an online multiplayer simulation game that is science-fiction based and provides science-based content for learning purposes (including environmental awareness and sustainable resource protection).

DESCRIPTION OF THE PREFERRED EMBODIMENTS

Figure 1:
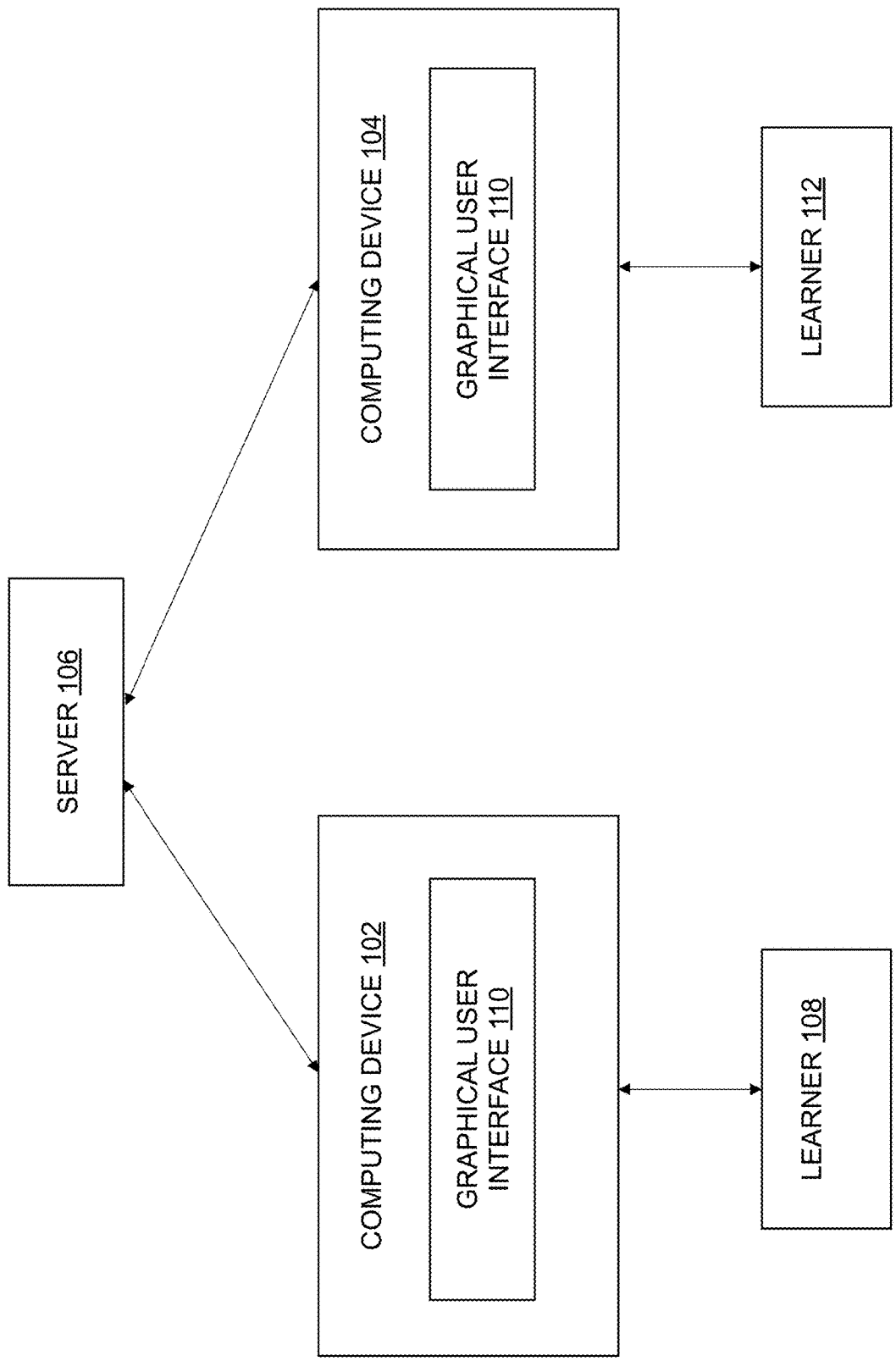
FIG. 1 depicts a block diagram of a system of motivating success of a learner in educational skill practice when playing an online multiplayer simulation game, in accordance with embodiments of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As used herein, the singular forms "a," "an," and "the," are intended to include the plural forms as well, unless the context clearly indicates otherwise.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, an "embodiment" means that a particular feature, structure or characteristic is included in at least one or more manifestations, examples, or implementations of this invention. Furthermore, the particular features, structures or characteristics may be combined in any suitable manner, as would be apparent to a person having ordinary skill in the art. Combinations of features of different embodiments are meant to be within the scope of the invention, without the need for explicitly describing every possible permutation by example. Thus, any of the claimed embodiments can be used in any combination.

The phrase "and/or," as used herein in the specification and in the claims, should be understood to mean "either or both" of the elements so conjoined, e.g., elements that are conjunctively present in some cases and disjunctively present in other cases. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements), etc.

As used herein, the word "include," and its variants, is intended to be non-limiting, such that recitation of items in a list is not to the exclusion of other like items that may also be useful in the compositions and methods of this technology. Similarly, the terms "can" and "may" and their variants are intended to be non-limiting, such that recitation that an embodiment can or may comprise certain elements or features does not exclude other embodiments of the present technology that do not contain those elements or features.

A system for an online multiplayer simulation game is depicted in FIG. 1. In some examples, the online multiplayer simulation game may be an educational game. In other examples, the online multiplayer simulation game is provided for entertainment purposes. It should be appreciated that in some examples, the online multiplayer simulation game described herein is a storytelling platform. In other examples, the online multiplayer simulation game described herein is a science fiction game. In further examples, the online multiplayer simulation game described herein is a science fiction-based game that provides science-based content for learning purposes (including environmental awareness and sustainable resource protection). In another example, the online multiplayer simulation game described herein may be a science-fiction online multiplayer simulation game set in a parallel universe where otters are the predominant species.

The system of FIG. 1 may include a first computing device 102 associated with a first learner 108 (e.g., a first user), a second computing device 104 associated with a second learner 112 (e.g., a second user), and a server 106. Each of the first computing device 102 and the second computing device 104 may be a desktop computer, a laptop computer, a smartphone (e.g., an iPhone®, a Blackberry®, or an Android OS-based phone, etc.), a cellular telephone, a tablet computer (e.g., an Apple iPad™, an HP Slate™, or a Motorola Xoom™, etc.), or an eBook reader (e.g., an Amazon Kindle™ or Barnes and Noble's Nook™ eReader, etc.), among other examples not explicitly listed herein. Each of the first learner 108 and the second learner 112 may be individuals capable to operate such computer device, and therefore, can include pre-kindergarten aged individuals.

The first learner 108 may interact with the first computing device 102 and the second learner 112 may interact with the second computing device 104 via a graphical user interface (GUI) 110 on the first computing device 102 and the second computing device 104, respectively. It should be appreciated that the online multiplayer simulation game may be played by a singular user during a given time period, such as the first learner 108. In other examples, the online multiplayer simulation game may be played by multiple users during the given time period, such as the first learner 108 and the second learner 112. The quantity of users engaging with the online multiplayer simulation game is non-limiting. The first learner 108 may access the online multiplayer simulation game via the first computing device 102 by connecting to the server 106, such as on the Internet 168 (of FIG. 2). Similarly, the second learner 112 may access the online multiplayer simulation game via the second computing device 104 by connecting to the server 106, such as on the Internet 168.

Figure 2:
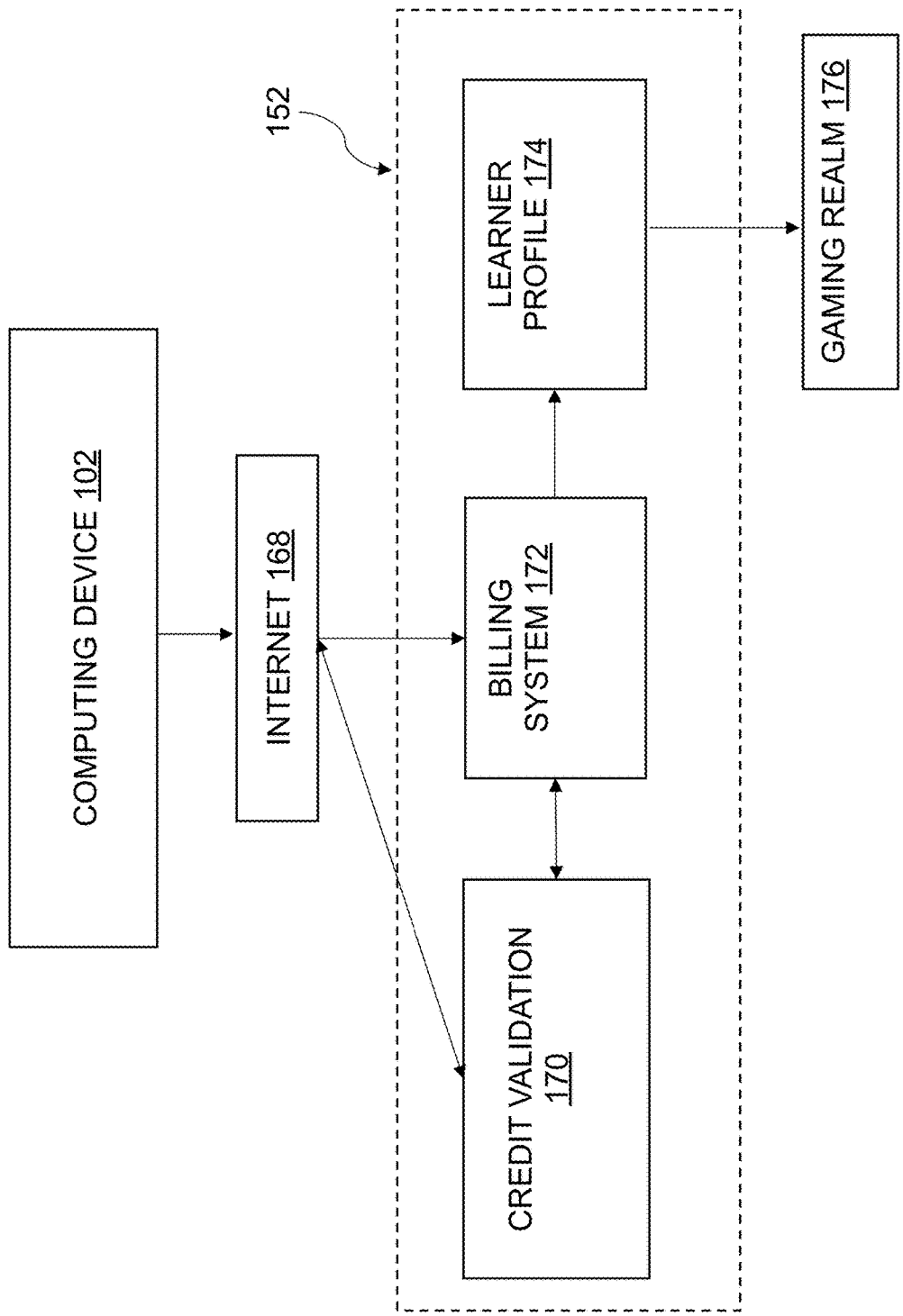
FIG. 2 depicts a block diagram of a method for a learner to connect to an online multiplayer simulation game, in accordance with embodiments of the present invention.

As shown in FIG. 2, the learner (e.g., the first learner 108) may be provided access to a gaming realm 176 associated with the online multiplayer simulation game. The gaming realm 176 serves as a social world framework to provide motivation for inducing frequent gameplay. According to FIG. 2, the learner (e.g., the first learner 108) may use an Internet connected computing device (e.g., the first computing device 102) for access to a connection 152. The connection 152 may be a web portal of the Internet 168, a wireless network with Internet 168 capability, or a dedicated network, such as one found in an educational institute.

The connection 152 contains a billing system 172 that verifies a payment status of an account associated with the first learner 108. The connection 152 also includes a credit validation engine 170 that verifies/validates a credit of the first learner 108, if a new account. Depending on the mode of operation, the account associated with the first learner 108 is charged on a periodic basis to maintain access to the online multiplayer simulation game. Furthermore, the online multiplayer simulation game described herein will allow the learner (e.g., the first learner 108) to make In-Game Purchases (IGPs). Each IGP may be verified via the billing system 172 and may be channeled and donated to one or more environmental causes. The connection 152 also contains a learner profile 174 associated with the first learner 108 that may be updated to log the access to the gaming realm 176 and updated periodically as gameplay continues.

In some examples, the online multiplayer simulation game may include a communication component (not shown) in an in-game information center, allowing the learner (e.g., the first learner 108) to view, read, and study real-life scientific research.

Figure 3:
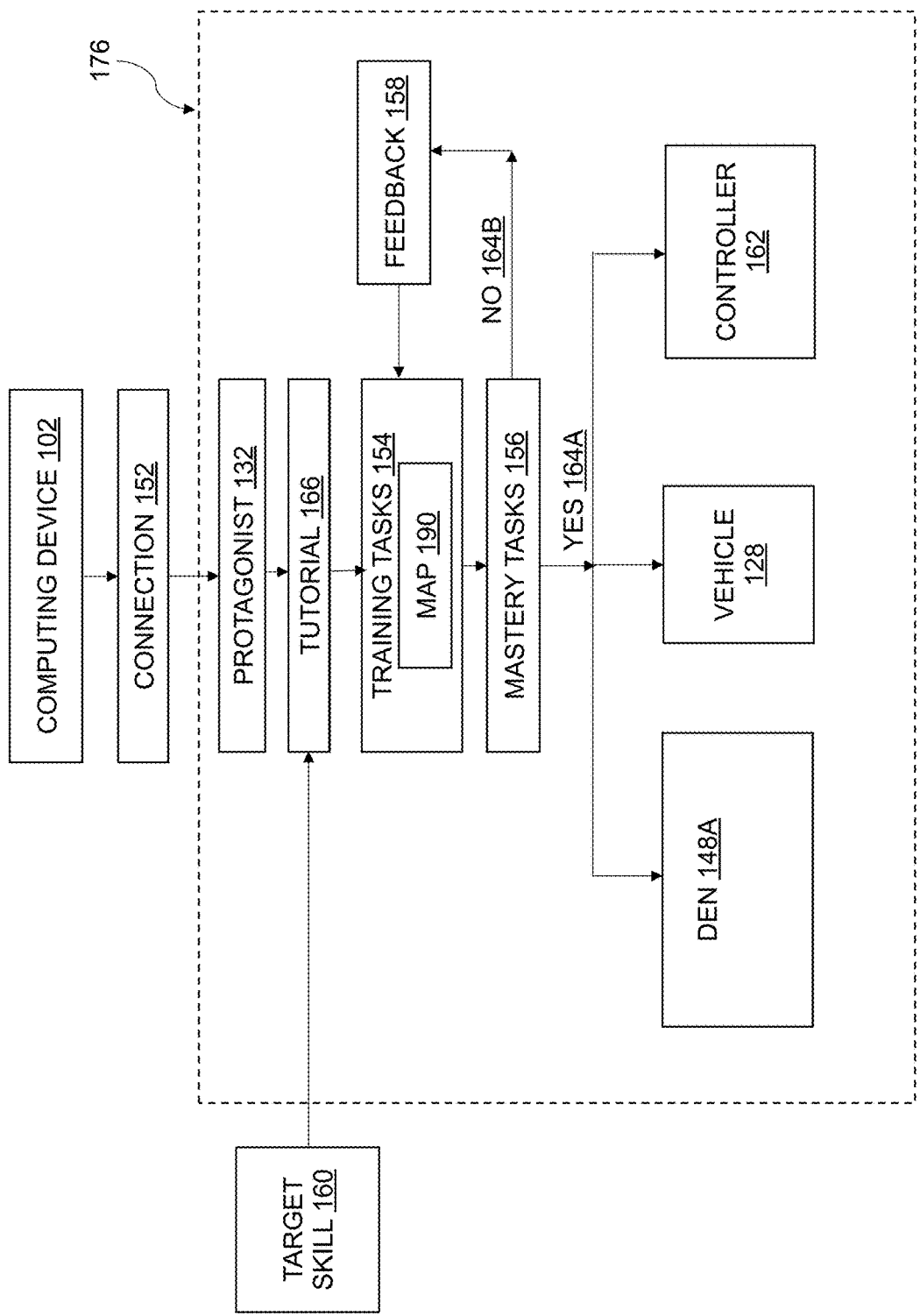
FIG. 3 depicts a block diagram of a method to teach educational skills to a learner when playing an online multiplayer simulation game, in accordance with embodiments of the present invention.

A block diagram of a method to teach educational skills (such as a target skill 160) to the learner (e.g., the first learner 108) is depicted in FIG. 3. In some examples, the target skill 160 includes learning the science behind water, learning about environmental awareness, and/or learning about sustainable resource protection, among others. As explained, the learner (e.g., the first learner 108) uses a computer or other gaming device (e.g., the first computing device 102) capable of receiving the learner's input to the online multiplayer simulation game via the GUI 110 and capable of displaying content of the gaming realm 176 to the learner (e.g., the first learner 108). The first computing device 102 is connected to the gaming realm 176 via the connection 152, as shown in FIG. 3.

Figure 5:
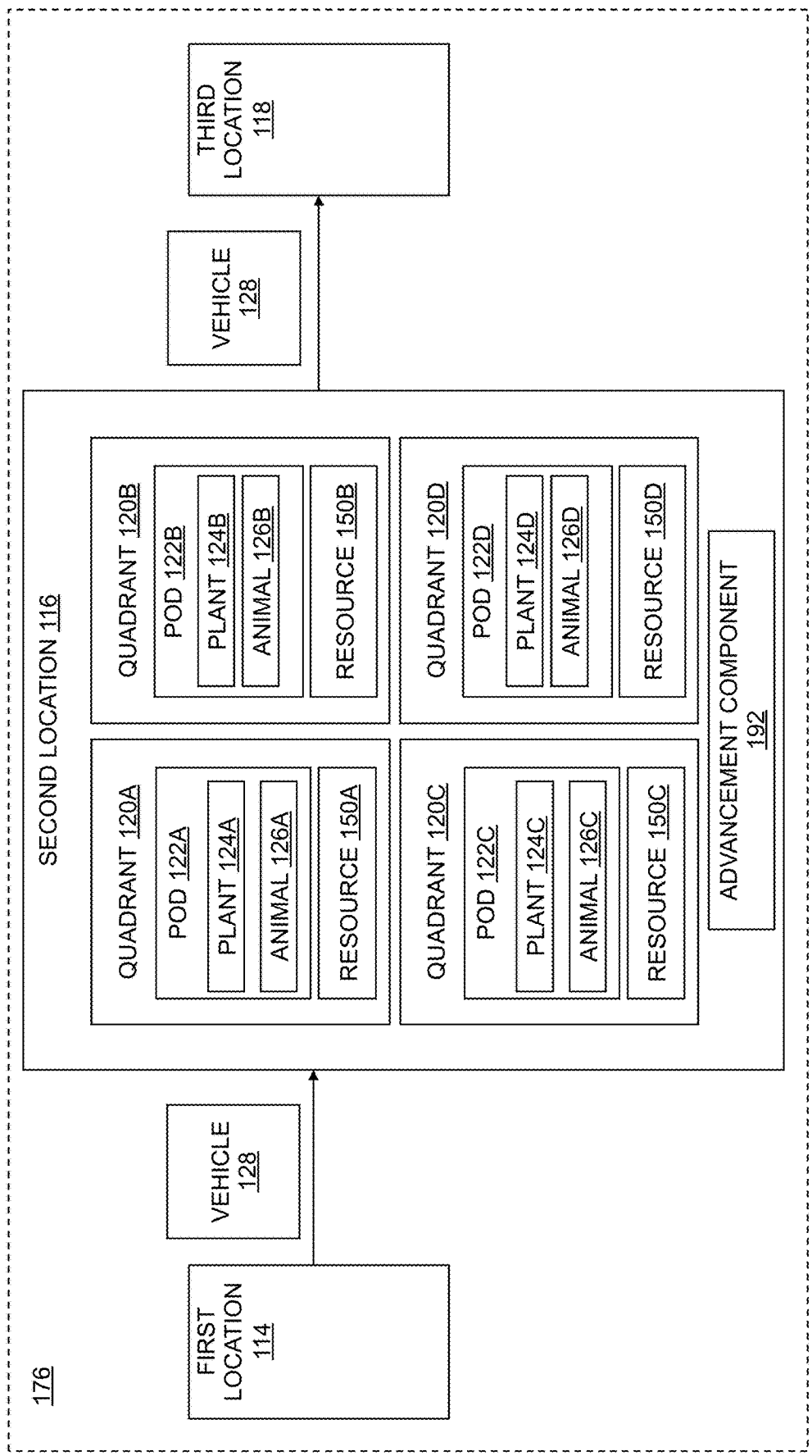
FIG. 5 depicts a block diagram of a gaming realm of an online multiplayer simulation game, in accordance with embodiments of the present invention.

A virtual world display of the gaming realm 176 may be provided to the learner (e.g., the first learner 108) subsequent connecting the first computing device 102 to the gaming realm 176 via the connection 152. In some examples, the virtual world comprises at least three locations. The at least three locations may include a first location 114, a second location 116, and a third location 118, as shown in FIG. 5. In some examples, the first location 114 includes Earth, the second location 116 includes outer space, and the third location 118 includes a planet.

In additional examples, the learner (e.g., the first learner 108) may be provided with a character in the gaming realm 176 such that the learner (e.g., the first learner 108) controls the character. In examples, the character is a protagonist 132, as depicted in FIG. 3. In further examples, the protagonist 132 is an animal. Preferably, the protagonist 132 is an otter.

The learner (e.g., the first learner 108) may also be provided with a vehicle 128 (of FIG. 3, FIG. 5, and FIG. 7) for the learner (e.g., the first learner 108) to use to advance through the online multiplayer educational game as the character (e.g., the protagonist 132). In some examples, the vehicle 128 is a spacecraft.

Figure 7:
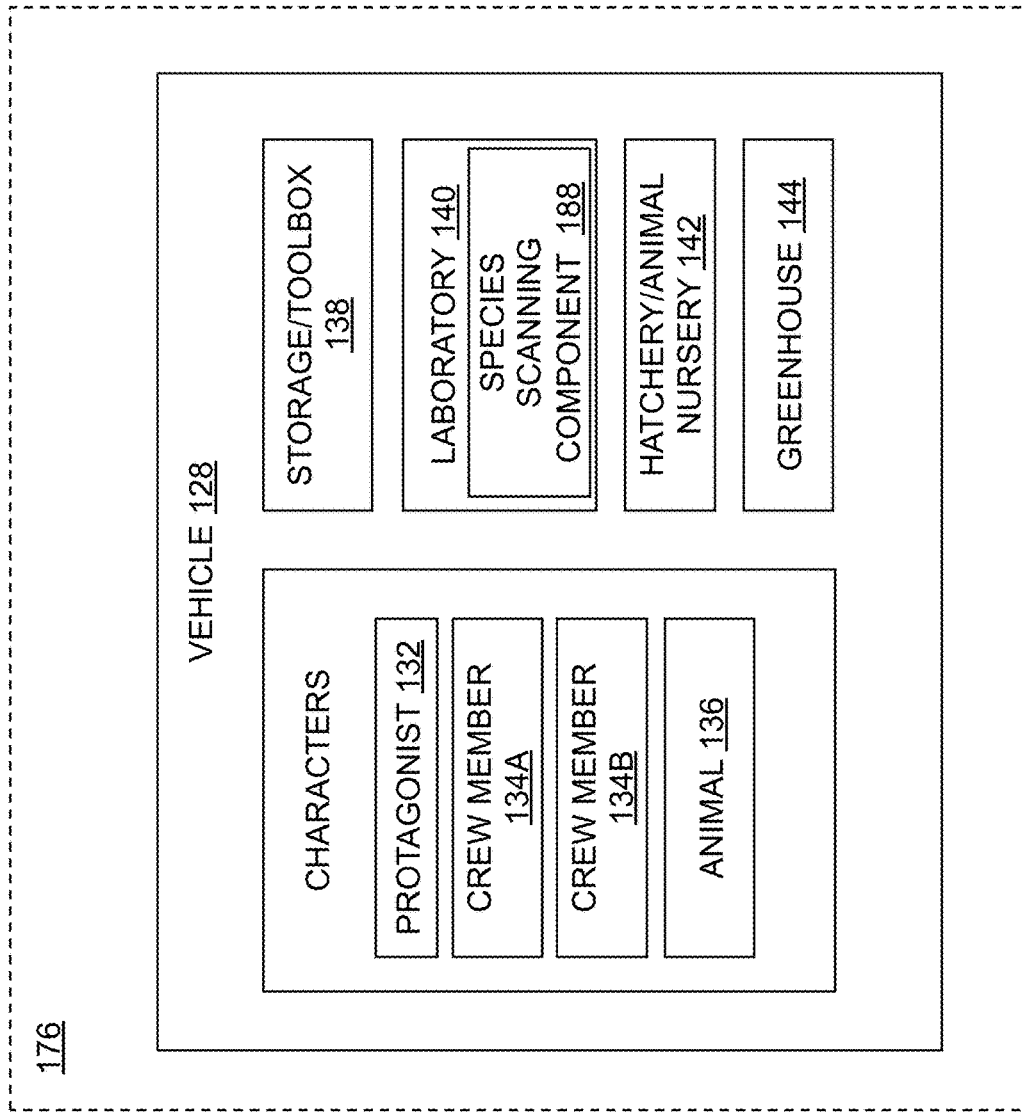
FIG. 7 depicts a block diagram of a vehicle for use in a gaming realm associated with an online multiplayer simulation game, in accordance with embodiments of the present invention.

In additional examples, and as depicted in FIG. 7, the vehicle 128 may comprise one or more rooms, such as a storage room/toolbox room 138 (to store resources, plant species, and/or animal species), a laboratory 140, a hatchery/animal nursery 142, and/or a greenhouse 144, among others not explicitly listed herein. When the learner (e.g., the first learner 108) enters a room of the one or more rooms in the vehicle 128, the room expands into its own scene.

It should be appreciated that the vehicle 128 serves as an innovative incubator, allowing for the learner (e.g., the first learner 108) to engage in controlled experimentation and learning through use of the one or more rooms (such as the laboratory 140). The learner (e.g., the first learner 108) may also use the vehicle 128 if the learner (e.g., the first learner 108) needs to escape dangers during gameplay. All of the tools, resources, plant species, and/or animal species accumulated within the vehicle 128 are applied to the creation and management of a den/dwelling (such as a first den 148A and/or a second den 138B of FIG. 8) in the third location 118. For example, the hatchery/animal nursery 142 and/or the greenhouse 144 serve to create small populations of plant and/or animal species such that these species may be later introduced into a habitat of the den/dwelling (e.g., the first den 148A) in the third location 118 in response to natural ecosystem fluctuations and environmental disturbances on the third location 118.

In an illustrative example and as shown in FIG. 5, the learner (e.g., the first learner 108) may utilize the vehicle 128 to leave the first location 114 (e.g., Earth) upon detecting that this location is severely environmentally compromised and may traverse the second location 116 (e.g., outer space) in search of a portal to another location (e.g., the third location 118 or the planet) to start life anew.

Moreover, as shown in FIG. 7, the learner (e.g., the first learner 108) may be provided at least two crew members (e.g., a first crew member 134A and a second crew member 134B) and an animal 136 to the learner (e.g., the first learner 108) to assist the learner (e.g., the first learner 108) in completing training tasks during gameplay. The at least two crew members (e.g., the first crew member 134A and the second crew member 134B) and the animal 136 serve as primary allies and sources of support and assistance for the learner (e.g., the first learner 108) during gameplay. Specifically, the learner (e.g., the first learner 108) is assigned the animal 136 at a beginning of gameplay in response to providing answers to a series of questions.

In some examples, the animal 136 is a spirit animal where a manifestation of the spirit animal in the gaming realm 176 is correlated to actions of the learner (e.g., the first learner 108) as the learner (e.g., the first learner 108) advances through the online multiplayer educational game as the character (e.g., the protagonist 132). Such manifestation of the animal 136 may be visible in the appearance of the animal 136. Interaction of the learner (e.g., the first learner 108) with the animal 136 provides the narrative of the online multiplayer educational game.

Moreover, the learner (e.g., the first learner 108) may be provided a controller 162 (of FIG. 3 and FIG. 4) to manage functions of the gaming realm 176. The controller 162 may include a plurality of squares 178 (of FIG. 4), where each of the squares 178 represents a function of the gaming realm 176. The functions of the gaming realm 176 may include accumulated skills, animal species cultivated, plant species cultivated, resources, and/or management strategies, among others not explicitly listed herein.

The controller 162 also functions as a control center that is constantly fluctuating during gameplay to represent changes in the vehicle 128, surrounding environs, a status of the first den 148A, environmental changes in the third location 118, etc. Controllable elements that impact the power supply, water quality, and sustainable food production are all monitored and displayed via the controller 162. The controller 162 also communicates an overall environmental health of the third location 118, including atmosphere, hydrosphere, lithosphere, and the interactions between the life forms present.

As shown in FIG. 3, the learner (e.g., the first learner 108) may be provided with a tutorial 166 and/or training tasks 154 associated with the educational skill 160. The tutorial 166 and/or the training tasks 154 may be quests, projects, competitions, and/or jobs the character must complete. As an illustrative example, the training tasks 154 associated with the target educational skill 160 may require the learner (e.g., the first learner 108) to work with a map, such as a celestial skies map 190, during a journey traversing the outer space (e.g., the second location 116). In examples, the celestial skies map 190 is an interactive resource that provides the learner (e.g., the first learner 108) with information and knowledge.

As explained, in some examples, the first location 114 includes the Earth, the second location 116 includes the outer space, and the third location 118 includes the planet. As shown in FIG. 5, the learner (e.g., the first learner 108) may utilize the vehicle 128 to leave the first location 114 (e.g., Earth) upon detecting that this location is severely environmentally compromised and may traverse the outer space (e.g., the second location 116) in search of a portal to the third location 118 or the planet. The learner (e.g., the first learner 108) may utilize the celestial skies map 190 and data collection tools along the journey. The learner (e.g., the first learner 108) may be tasked with finding the portal to the third location 118 or the planet before the vehicle 128 runs out of vital resources.

In additional examples, and as depicted in FIG. 5, the outer space (e.g., the second location 116) includes quadrants. The quadrants include a first quadrant 120A, a second quadrant 120B, a third quadrant 120C, and a fourth quadrant 120D, as shown in FIG. 5. Progression of the learner (e.g., the first learner 108) from one of the quadrants (e.g., the first quadrant 120A) to another quadrant (e.g., the second quadrant 120B) gives the learner (e.g., the first learner 108) opportunities and a sense of advancement.

During this journey, the learner (e.g., the first learner 108) may encounter pods and/or collect resources. Each of the first quadrant 120A, the second quadrant 120B, the third quadrant 120C, and the fourth quadrant 120D comprises a first pod 122A, a second pod 122B, a third pod 122C, and a fourth pod 122D, respectively. Further, each of the first quadrant 120A, the second quadrant 120B, the third quadrant 120C, and the fourth quadrant 120D comprise one or more resources (e.g., a first resource 150A, a second resource 150B, a third resource 150C, and a fourth resource 150D).

Each of the first pod 122A, the second pod 122B, the third pod 122C, and the fourth pod 122D comprise plant species and/or animal species. In examples, each of the first pod 122A, the second pod 122B, the third pod 122C, and the fourth pod 122D differ in contents. For example, and as depicted in FIG. 5, the first pod 122A associated with the first quadrant 120A includes a first plant species 124A and/or a first animal species 126A, the second pod 122B associated with the second quadrant 120B includes a second plant species 124B and/or a second animal species 126B, the third pod 122C associated with the third quadrant 120C includes a third plant species 124C and/or a third animal species 126C, and the fourth pod 122D associated with the fourth quadrant 120D includes a fourth plant species 124D and/or a fourth animal species 126D. In other examples, the first pod 122A, the second pod 122B, the third pod 122C, and the fourth pod 122D share in a subset of the contents (e.g., the plant species and/or the animal species).

In examples, one or more of the first pod 122A, the second pod 122B, the third pod 122C, and the fourth pod 122D may be presented to the learner (e.g., the first learner 108) when the learner (e.g., the first learner 108) successfully demonstrates mastery tasks 156 associated with the educational skill 160 (of FIG. 3). In examples, the mastery tasks 156 may include quests, projects, competitions, and/or jobs the character must complete.

In other examples, one or more of the first pod 122A, the second pod 122B, the third pod 122C, and the fourth pod 122D may be presented to the learner (e.g., the first learner 108) when the learner (e.g., the first learner 108) enters a given quadrant and encounters the pod. For examples, the first pod 122A may be presented to the learner (e.g., the first learner 108) when the learner (e.g., the first learner 108) enters the first quadrant 120A and encounters the first pod 122A. In other examples, one or more of the first pod 122A, the second pod 122B, the third pod 122C, and the fourth pod 122D may be randomly presented to the learner (e.g., the first learner 108) when the learner (e.g., the first learner 108) advances through the online multiplayer educational game as the character.

When the learner (e.g., the first learner 108) encounters a pod (e.g., the first pod 122A) or is rewarded the pod (e.g., the first pod 122A), the learner (e.g., the first learner 108) may bring the pod (e.g., the first pod 122A) to the laboratory 140 on the vehicle 128. The laboratory 140 may have a species scanning component 188 (as shown in FIG. 7). The species scanning component 188 may receive the pod (e.g., the first pod 122A) from the learner (e.g., the first learner 108) and may reveal a subset of traits associated with the pod (e.g., the first pod 122A). In some examples, a quantity of the subset of traits associated with the pod (e.g., the first pod 122A) is three, but the quantity of the subset of traits associated with the pod (e.g., the first pod 122A) is non-limiting. The learner (e.g., the first learner 108) must then discover the remainder of the traits associated with the pod (e.g., the first pod 122A) during gameplay.

Figure 6:
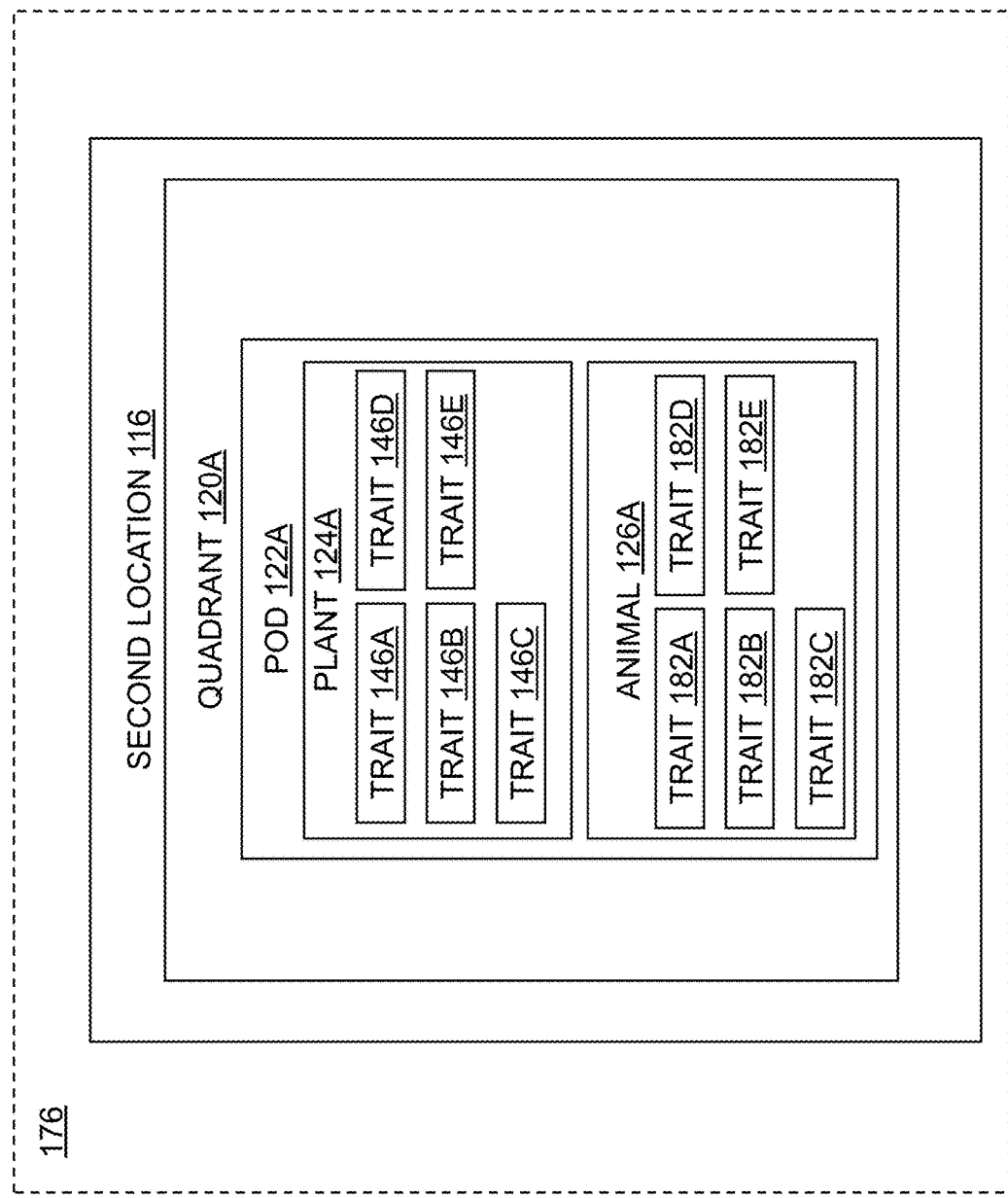
FIG. 6 depicts another block diagram of a gaming realm of an online multiplayer simulation game, in accordance with embodiments of the present invention.

Each of the plant species and/or the animal species within the pod (e.g., the first pod 122A) may comprise traits. For example, as depicted in FIG. 6, the first pod 122A comprises the first plant species 124A and the first animal species 126A. The first plant species 124A may comprise a first trait 146A, a second trait 146B, a third trait 146C, a fourth trait 146D, and/or a fifth trait 146E, among others. The first animal species 126A may include a first trait 182A, a second trait 182B, a third trait 182C, a fourth trait 182D, and/or a fifth trait 182E, among others. Examples of these traits may include: a producer trait, a consumer trait, a predator trait, a prey trait, a cleaner trait, or a polluter trait, among others.

Subsequent receiving the quantity of the subset of traits associated with the pod (e.g., the first pod 122A), the learner (e.g., the first learner 108) must decide how the learner (e.g., the first learner 108) can foster a well-balanced ecosystem of plant and animal species on the vehicle 128, which will be transplanted and enhanced once the learner (e.g., the first learner 108) reaches the third location 118. The learner (e.g., the first learner 108) must decide whether to bring the pod (e.g., the first pod 122A) onto the vehicle 128, leave the pod (e.g., the first pod 122A) where the learner (e.g., the first learner 108) encountered it, put the pod (e.g., the first pod 122A) in the storage room/toolbox room 138 of the vehicle 128, or allocate the pod (e.g., the first pod 122A) to the hatchery/animal nursery 142 or the greenhouse 144 on the vehicle 128.

In other examples, the second location 116 or the outer space may include an advancement component 192 (of FIG. 5) that allows the learner (e.g., the first learner 108) to progress forward or backward to another quadrant, allowing for a modification of the gameplay and providing experimental shortcuts for experienced players. In an illustrative example, the advancement component 192 may be configured as a wormhole.

Figure 8:
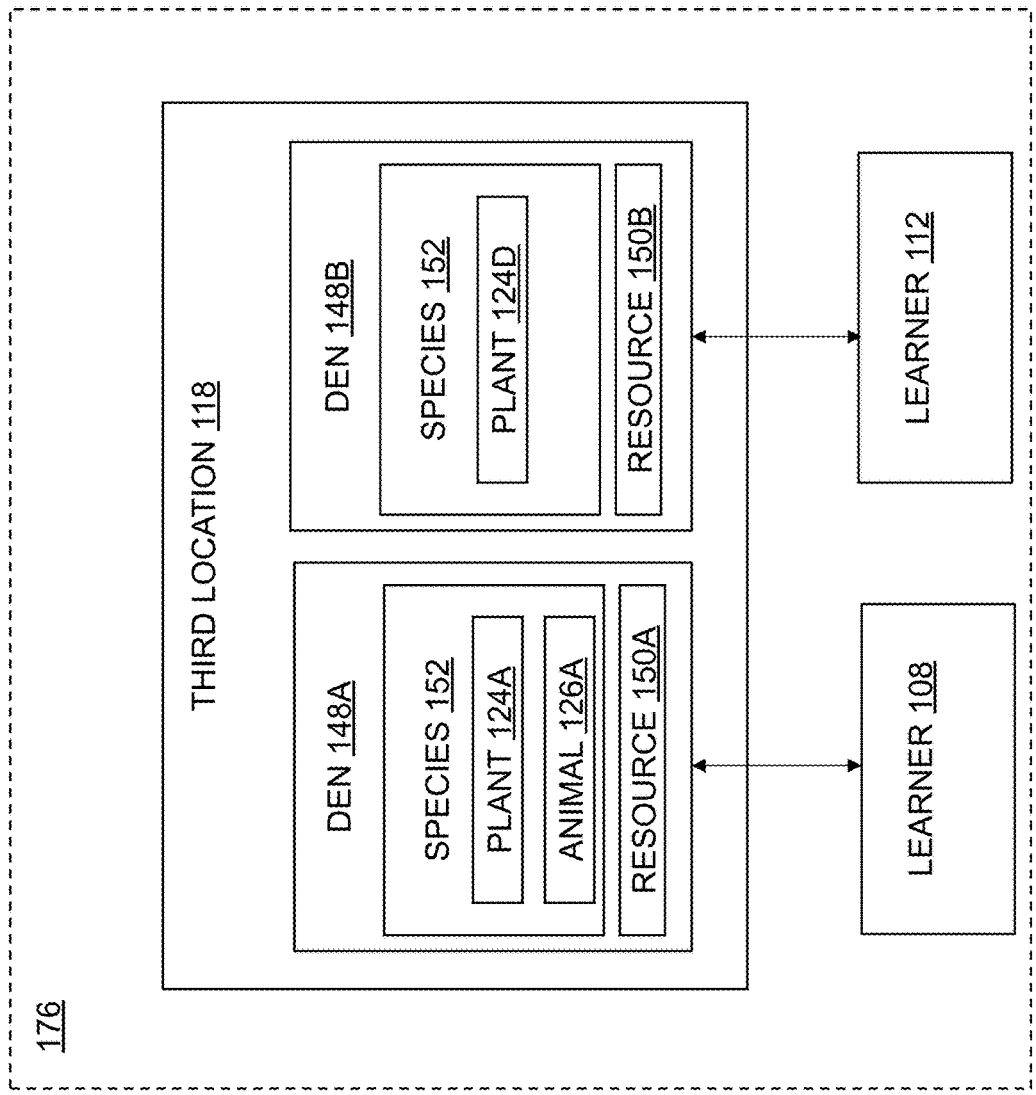
FIG. 8 depicts another block diagram of a gaming realm of an online multiplayer simulation game, in accordance with embodiments of the present invention.

Once the learner (e.g., the first learner 108) traverses the second location 116 and arrives at the third location 118 or the planet, the learner (e.g., the first learner 108) must collect as much intel about this new world such that the learner (e.g., the first learner 108) designs and builds the den/dwelling (e.g., the first den 148A), as shown in FIG. 8. The learner (e.g., the first learner 108) must sustain dynamic equilibrium in the third location 118. In doing so, the learner (e.g., the first learner 108) will be asked to continually make decisions in order to find a balance between species, resources, and sometimes conflicting priorities, such as choosing if/when to expand the first den 148A with offspring. The learner (e.g., the first learner 108) must also navigate numerous factors, such as the ever-changing physical dynamics of the environs and atmosphere that produce extreme environmental fluctuations and potentially destructive, wild weather events; the presence of ominous co-inhabitants and unexpected visitors that cause colossal infestations; the persistent mind-bending and challenging impossibilities of this planet; and the looming contamination and/or depletion of a resource supply of the learner (e.g., the first learner 108).

In additional examples, randomly during gameplay, suggested dwelling/den connections may be presented to the learner (e.g., the first learner 108). For example, it may be suggested to the learner (e.g., the first learner 108) for the first learner 108 to interact with the second learner 112 associated with the second den 138B. The first learner 108 may also seek out other dwellings/dens to explore the third location 118.

As explained, during gameplay, upon detection of a successful demonstration of the training tasks 154 associated with the educational skill 160, the learner (e.g., the first learner 108) may be provided with mastery tasks 156 (of FIG. 3) associated with the educational skill 160. When a successful demonstration of the mastery tasks 156 is detected (e.g., a "YES" determination 164A of FIG. 3), the learner (e.g., the first learner 108) may be allowed to advance through the online multiplayer educational game as the character. The learner (e.g., the first learner 108) may also be allowed to modify one or more components in the gaming realm 176. Additionally, the learner profile 174 associated with the first learner 108 may be updated to reflect a successful completion of the mastery tasks 156 associated with the target educational skill 160.

Since the vehicle 128 is a constant measure of the level of mastery of the learner (e.g., the first learner 108) throughout gameplay, the modification of the one or more components in the gaming realm 176 may include: adding components to the vehicle 128, enhancing an efficiency of the vehicle 128, adding facilities to the vehicle 128, unlocking helpful information for game advancement, providing new crew members to the learner (e.g., the first learner 108), providing new technologies to the learner (e.g., the first learner 108) to add to the storage room/toolbox room 138 in the vehicle 128, upgrading the vehicle 128, allowing the learner (e.g., the first learner 108) to add the plant species (e.g., the first plant species 124A) and/or the animal species (e.g., the first animal species 126A) from the pod (e.g., the first pod 122A) into a room/location within the vehicle 128 (such as the storage room/toolbox room 138, the laboratory 140, the hatchery/animal nursery 142, or the greenhouse 144), and/or adding one or more resources encountered in a given quadrant into the room/location the vehicle 128 (such as the storage room/toolbox room 138, the laboratory 140, the hatchery/animal nursery 142, or the greenhouse 144), among others not explicitly listed herein. All of the tools accumulated within the vehicle 128 are applied to the creation and management of the first den 148A associated with the learner (e.g., the first learner 108).

Figure 4:
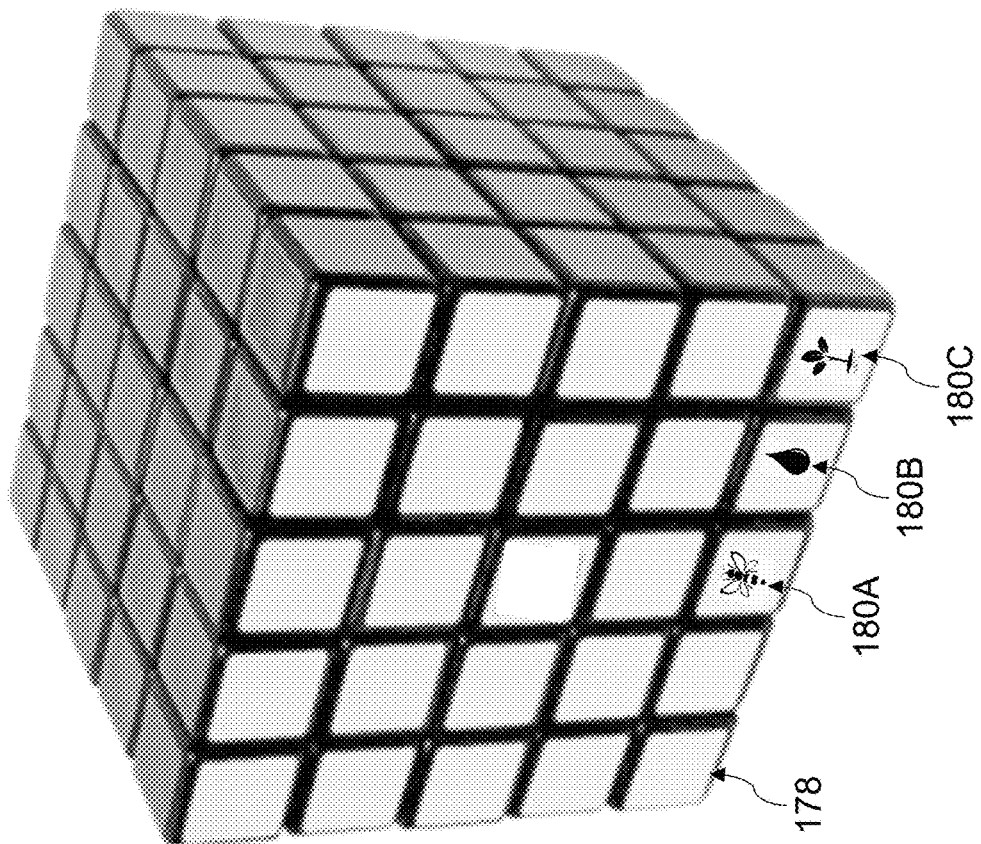
FIG. 4 depicts a schematic diagram of a controller utilized within a system of FIG. 1, in accordance with embodiments of the present invention.

The modification of the one or more components in the gaming realm may additionally include: adding a function of the gaming realm to the controller 162 (where each of the squares 178 represents a function of the gaming realm 176). As explained previously, the functions of the gaming realm 176 include: accumulated skills, animal species cultivated, plant species cultivated, resources, and/or management strategies, among others not explicitly listed herein. Each of these functions of the gaming realm 176 may be displayed via a visual icon (e.g., a first visual icon 180A, a second visual icon 180B, and a third visual icon 180C) on a select square of the squares 178 of the controller 162. It should be appreciated that the visual icons depicted in FIG. 4 are non-limiting and are provided for illustrative purposes only. In another example, the learner (e.g., the first learner 108) may acquire another function of the gaming realm 176 by reaching the third location 118, forming new alliances with other dwellings/dens associated with other users at the third location 118, or randomly during gameplay. In a further example, the modification of the one or more components in the gaming realm 176 may include allowing the learner (e.g., the first learner 108) to add acquired resources, plant species, and/or animal species into the den/dwelling (e.g., the first den 148A).

In response to detecting a failure to demonstrate the mastery tasks 156 associated with the educational skill 160 (e.g., a "NO" response 164B as depicted in FIG. 3), the learner (e.g., the first learner 108) is provided feedback 158 (of FIG. 3) via the gaming realm 176. Moreover, the learner profile 174 is updated to reflect an unsuccessful completion of the mastery tasks 156 associated with the educational skill 160.

As explained, the online multiplayer simulation game may be played by a singular user during a given time period, such as the first learner 108. In other examples, the online multiplayer simulation game may be played by multiple users during the given time period, such as the first learner 108 and the second learner 112. In the multiple-user scenario, a geolocation component (not shown) may be used to define in-game position of the learner (e.g., the first learner 108) such that the first learner 108 may interact with or connect with another user/learner, such as the second learner 112, when playing the multiplayer version of the game. In this multiple-user scenario, each of the learners (e.g., the first learner 108 and the second learner 112) may meet with other users/learners at one or more of the dwellings/dens in the third location 18 and may trade supplies and/or knowledge gained.

Success of the learner (e.g., the first learner 108) in the online multiplayer simulation game depends on numerous components, such as: leadership abilities of the learner (e.g., the first learner 108), data collection of the learner (e.g., the first learner 108), resource gathering of the learner (e.g., the first learner 108), decision-making of the learner (e.g., the first learner 108), construction and expansion of the dwelling/den (e.g., the first den 148A) of the learner (e.g., the first learner 108), an ability of the learner (e.g., the first learner 108) to respond to sudden disruptions, a capacity of the learner (e.g., the first learner 108) to make creative use of data collected, an ability of the learner (e.g., the first learner 108) to follow the celestial skies map 190, an ability of the learner (e.g., the first learner 108) in deciphering and making use of clues, strategic decision-making of the learner (e.g., the first learner 108), an ability of the learner (e.g., the first learner 108) to sustainably balance the built systems of the dwelling/den (e.g., the first den 148A) with the dynamic natural world (e.g., the third location 118 or the planet), and/or an ability of the learner (e.g., the first learner 108) to seek out and collaborate with other dens/dwellings on the third location 118 (e.g., the second den 138B) to collectively overcome large-scale (and devastating) natural phenomenon, planetary foes, and rapid infestations, among others.

Alternate Embodiment

An alternative embodiment to the online multiplayer simulation game described herein includes an educational online multiplayer simulation game aimed to teach learners/users about the science of aerodynamics and the laws and creativity of acrobatics. Game play mechanics and visual narratives of this alternative embodiment may include graphic overlays detailing super human bodily structure and source of powers.

In this embodiment, the online multiplayer simulation game provides, via the gaming realm 176, the learner (e.g., the first learner 108) with the character (e.g., the protagonist 132) such that the learner controls the character. In this embodiment, the character (e.g., the protagonist 132) is a squirrel. The learner (e.g., the first learner 108) may navigate gameplay as the squirrel and may race against other users/learners (e.g., the second learner 112) to destinations (such as the third location 118) where food supplies and other vital resources abound.

During the journey, the learner (e.g., the first learner 108) may explore varying tree habitats that span the globe and all types of landscapes. Such tree habitats may include thriving habitats, compromised habitats, urban habitats, and/or wild habitats, among others. During travel, the learner (e.g., the first learner 108) must avoid threats, such as falling, starvation, pollution, toxic water bodies, human-placed poison traps, cars, minks, martens, skunks, ravens, magpies, eagles, owls, hawks, badgers, domesticated dogs and cats, snakes, and/or raccoons, etc., and must consume and collect food and water resources in support of their energetic needs.

Systems, Devices and Operating Systems

Figure 9:
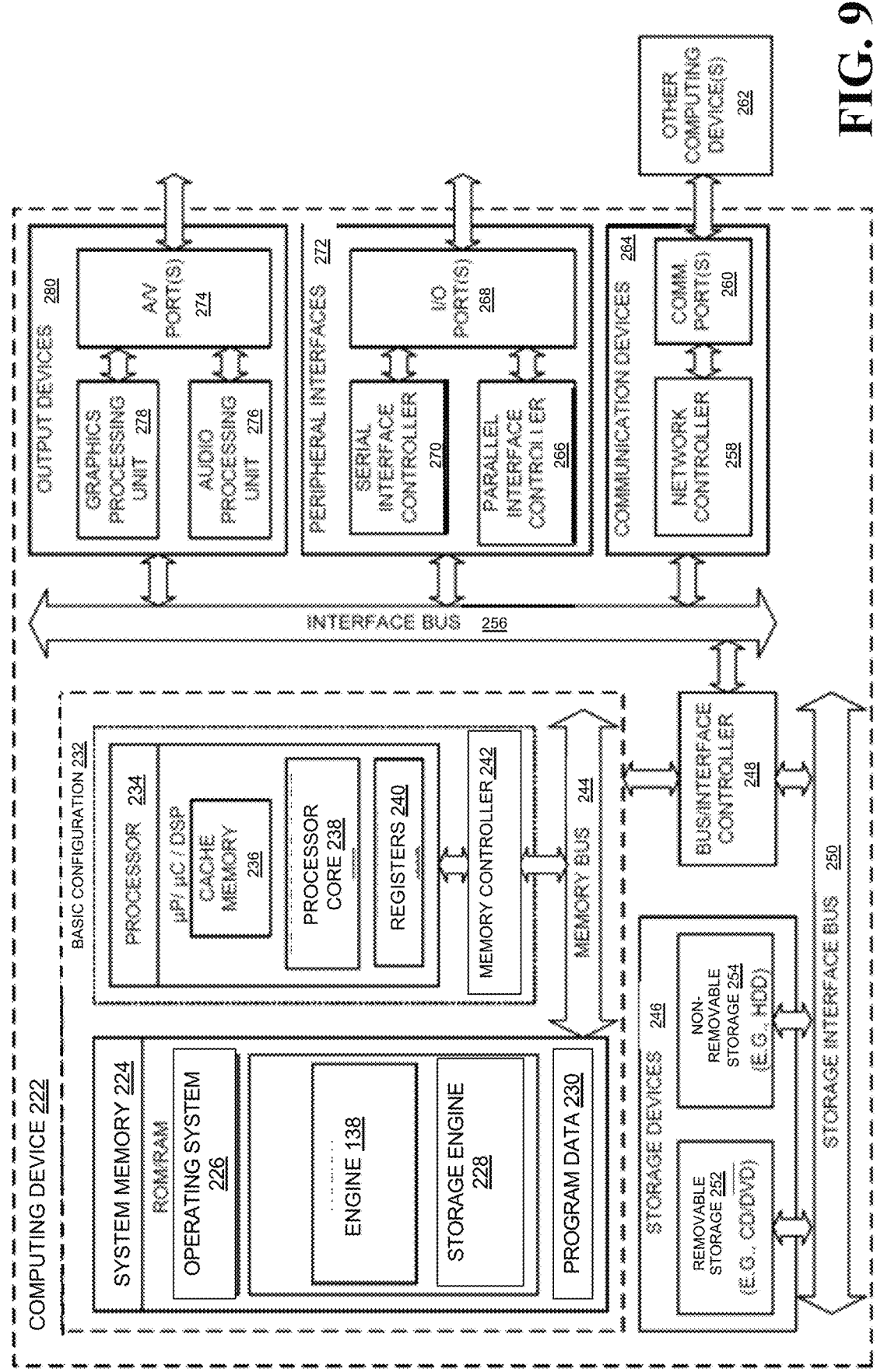
FIG. 9 is a block diagram of a computing device, in accordance with embodiments of the present invention.

A basic configuration 232 of a computing device 222 (such as the first computing device 102 or the second computing device 104 of FIG. 1) is illustrated in FIG. 9 by those components within the inner dashed line. In the basic configuration 232 of the computing device 222, the computing device 222 includes a processor 234 and a system memory 224. The terms "processor" and "central processing unit" or "CPU" are used interchangeably herein. In some examples, the computing device 222 may include one or more processors and the system memory 224. A memory bus 244 is used for communicating between the one or more processors 234 and the system memory 224.

Depending on the desired configuration, the processor 234 may be of any type, including, but not limited to, a microprocessor (µP), a microcontroller (µC), and a digital signal processor (DSP), or any combination thereof. In examples, the microprocessor may be AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s).

Further, the processor 234 may include one more levels of caching, such as a level cache memory 236, a processor core 238, and registers 240, among other examples. The processor core 238 may include an arithmetic logic unit (ALU), a floating point unit (FPU), and/or a digital signal processing core (DSP Core), or any combination thereof. A memory controller 242 may be used with the processor 234, or, in some implementations, the memory controller 242 may be an internal part of the memory controller 242.

Depending on the desired configuration, the system memory 224 may be of any type, including, but not limited to, volatile memory (such as RAM), and/or non-volatile memory (such as ROM, flash memory, etc.), or any combination thereof. The system memory 224 includes an operating system 226, one or more engines, such as an engine 138, and program data 230. In some embodiments, the engine 138 may be an application, a software program, a service, or a software platform, as described infra. The system memory 224 may also include a storage engine 228 that may store any information of data disclosed herein.

The operating system 226 may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millennium/NT/Vista/XP (Server), Palm OS, and/or the like. The operating system 226 may be one specifically optimized to be run on a mobile computing device (e.g., the first computing device 102 or the second computing device 104 of FIG. 1), such as iOS, Android, Windows Phone, Tizen, Symbian, and/or the like.

As explained supra, the GUI 110 of the first computing device 102 and the second computing device 104 may provide a baseline and means of accessing and displaying information graphically to users. The GUI 110 may include Apple Macintosh Operating System's Aqua, IBM's OS/2, Microsoft's Windows 2000/2003/3.1/95/98/CE/Millennium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, or Yahoo! User Interface, any of which may be used.

Additionally, a web browser component (not shown) is a stored program component that is executed by the CPU. The web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices (e.g., the first computing device 102 or the second computing device 104 of FIG. 1).

A web browser may communicate to and/or with other components in a component collection, including itself, and/or facilities of the like. Most frequently, the web browser communicates with information servers, operating systems (such as the operating system 226), integrated program components (e.g., plug-ins), and/or the like; e.g., it may contain, communicate, generate, obtain, and/or provide program component, system, user, and/or data communications, requests, and/or responses. Of course, in place of a web browser and an information server, a combined application may be developed to perform similar functions of both. The combined application would similarly affect the obtaining and the provision of information to users, user agents, and/or the like from the enabled nodes of the present invention.

Moreover, the computing device 222 may have additional features or functionality, and additional interfaces to facilitate communications between the basic configuration 232 and any desired devices and interfaces. For example, a bus/interface controller 248 is used to facilitate communications between the basic configuration 232 and data storage devices 246 via a storage interface bus 250. The data storage devices 246 may be one or more removable storage devices 252, one or more non-removable storage devices 254, or a combination thereof. Examples of the one or more removable storage devices 252 and the one or more non-removable storage devices 254 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 256 facilitates communication from various interface devices (e.g., one or more output devices 280, one or more peripheral interfaces 272, and one or more communication devices 264) to the basic configuration 232 via the bus/interface controller 256. Some of the one or more output devices 280 include a graphics processing unit 278 and an audio processing unit 276, which are configured to communicate to various external devices, such as a display or speakers, via one or more A/V ports 274.

The one or more peripheral interfaces 272 may include a serial interface controller 270 or a parallel interface controller 266, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 268.

Further, the one or more communication devices 264 may include a network controller 258, which is arranged to facilitate communication with one or more other computing devices 262 over a network communication link via one or more communication ports 260. The one or more other computing devices 262 include servers (such as the server 106 of FIG. 1), the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 224, the one or more removable storage devices 252, and the one or more non-removable storage devices 254 are examples of the computer-readable storage media. The computer-readable storage media is a tangible device that can retain and store instructions (e.g., program code) for use by an instruction execution device (e.g., the computing device 222). Any such, computer storage media is part of the computing device 222.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer-readable instructions are provided to the processor 234 of a general purpose computer, special purpose computer, or other programmable data processing apparatus (e.g., the computing device 222) to produce a machine, such that the instructions, which execute via the processor 234 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 222), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to block diagrams of methods, computer systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method of providing an online multi player educational game to a learner from a server, the method comprising:
   detecting a connection of a computing device associated with a learner to a server;
   providing a virtual world display of a gaming realm associated with the online multiplayer educational game to the computing device of the learner;
   providing, via the gaming realm, the learner with a character such that the learner controls the character;
   providing, via the gaming realm, training tasks associated with an educational skill;
   in response to detecting, via the gaming realm, a successful demonstration of the training tasks associated with the educational skill, providing mastery tasks associated with the educational skills; and
   in response to detecting, via the gaming realm, a successful demonstration of the mastery tasks associated with the educational skill,
      allowing the learner to advance through the online multiplayer educational game as the character;
      modifying one or more components in the gaming realm; and
      updating a learner profile to reflect a successful completion of the mastery tasks associated with the educational skill.

2. The method of claim 1, further comprising:
   in response to detecting a failure, via the gaming realm, to demonstrate the mastery tasks associated with the educational skill,
      providing feedback to the learner via the gaming realm; and
      updating the learner profile to reflect an unsuccessful completion of the mastery tasks associated with the educational skill.

3. The method of claim 1,
   wherein the online multi player educational game is a science fiction game, and
   wherein the character is an animal.

4. The method of claim 1, further comprising:
   providing, via the gaming realm, a vehicle for the learner to advance through the online multi player educational game as the character.

5. The method of claim 4, wherein the vehicle is a spacecraft.

6. The method of claim 4, wherein the modification of the one or more components in the gaming realm is selected from the group consisting of: adding components to the vehicle, enhancing an efficiency of the vehicle, and upgrading the vehicle.

7. The method of claim 1, further comprising:
   providing, via the gaming realm, at least two crew members and another animal to the learner to assist the learner in completing the training tasks and the mastery tasks.

8. The method of claim 7, wherein a manifestation of the other animal in the gaming realm is correlated to actions of the learner as the learner advances through the online multiplayer educational game as the character.

9. The method of claim 1, wherein the virtual world comprises at least three locations.

10. The method of claim 9,
    wherein a first location of the at least three locations comprises quadrants,
    wherein each of the quadrants includes a pod and resources,
    wherein the pod in each of the quadrants differs, and
    wherein the pod comprises plant species and/or animal species.

11. The method of claim 10, wherein the modification of the one or more components in the gaming realm comprises allowing the learner to add the plant species and/or the animal species from the pod and the resources from each of the quadrants into a vehicle the learner utilizes to advance through the online multiplayer educational game as the character.

12. The method of claim 10, further comprising:
    presenting, via the gaming realm, the pod to the learner when the learner enters the quadrant and encounters the pod; or
    randomly presenting, via the gaming realm, the pod to the learner as the learner advances through the online multiplayer educational game as the character.

13. The method of claim 1, further comprising:
    allowing, via the gaming realm, the learner to utilize a controller to manage functions of the gaming realm.

14. The method of claim 13, wherein the modification of the one or more components in the gaming realm comprises adding a function of the gaming realm to the controller.

15. The method of claim 1, wherein the modification of the one or more components in the gaming realm comprises allowing the learner to add acquired resources, plant species, and/or animal species into a dwelling associated with a second location of the at least three locations located in the virtual world.

16. A method of providing an online multi player educational and science fiction game to a learner from a server, the method comprising:
    detecting a connection of a computing device associated with a learner to a server;
    providing a virtual world display of a gaming realm associated with the online multiplayer educational game to the computing device of the learner, wherein the virtual world comprises at least three locations;
    allowing the learner to utilize a controller to manage functions of the gaming realm;
    providing, via the gaming realm, the learner with a character such that the learner controls the character;
    providing, via the gaming realm, a vehicle for the learner to advance through the online multiplayer educational game as the character;
    providing, via the gaming realm, training tasks associated with an educational skill;
    in response to detecting, via the gaming realm, a successful demonstration of the training tasks associated with educational skill, providing mastery tasks associated with the educational skill;
    in response to detecting, via the gaming realm, a successful demonstration of the mastery tasks associated with the educational skill,
       allowing the learner to advance through the online multiplayer educational game as the character;
       modifying one or more components in the gaming realm; and
       updating a learner profile to reflect a successful completion of the mastery tasks associated with the educational skill; and
    in response to detecting a failure, via the gaming realm, to demonstrate the mastery tasks associated with the educational skill,
       providing feedback to the learner via the gaming realm; and updating the learner profile to reflect an unsuccessful completion of the mastery tasks associated with the educational skill.

17. The method of claim 16,
wherein a first location of the at least three locations comprises quadrants,
wherein each of the quadrants comprises a pod and resources,
wherein the pod in each of the quadrants differs, and
wherein the pod comprises plant species and/or animal species.

18. The method of claim 17, wherein the modification of the one or more components in the gaming realm is selected from the group consisting of: adding components to the vehicle, enhancing an efficiency of the vehicle, upgrading the vehicle, allowing the learner to add the plant species and/or the animal species from the pod into the vehicle, allowing the learner to add the resources from each of the quadrants into the vehicle, adding a function of the gaming realm to the controller, and allowing the learner to add acquired resources, plant species, and/or animal species into a dwelling associated with a second location of the at least three locations located in the virtual world.

* * * * *